United States Patent
Ding et al.

(10) Patent No.: US 6,580,977 B2
(45) Date of Patent: Jun. 17, 2003

(54) HIGH EFFICIENCY FUEL CELL AND BATTERY FOR A HYBRID POWERTRAIN

(75) Inventors: Yi Ding, Canton, MI (US); Joseph Carl Burba, Ramona, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/761,285

(22) Filed: Jan. 16, 2001

(65) Prior Publication Data

US 2002/0095247 A1 Jul. 18, 2002

(51) Int. Cl.⁷ ................................................ B60K 9/00
(52) U.S. Cl. ................... 701/22; 180/65.1; 180/307; 477/5; 318/139; 318/382
(58) Field of Search ................. 701/22; 477/5, 477/3; 180/65.1, 65.3, 307, 308, 305, 197, 65.2; 318/139, 382, 376

(56) References Cited

U.S. PATENT DOCUMENTS

| | | | |
|---|---|---|---|
| 5,318,142 A | | 6/1994 | Bates et al. |
| 5,359,308 A | * | 10/1994 | Sun et al. ............ 335/216 |
| 5,722,502 A | | 3/1998 | Kubo |
| 5,780,980 A | | 7/1998 | Naito |
| 5,820,172 A | | 10/1998 | Brigham et al. |
| 5,887,674 A | * | 3/1999 | Gray, Jr. ............ 180/307 |
| 5,898,282 A | | 4/1999 | Drozdz et al. |
| 5,929,594 A | | 7/1999 | Nonobe et al. |
| 5,929,595 A | | 7/1999 | Lyons et al. |
| 5,991,670 A | | 11/1999 | Mufford et al. |
| 5,998,960 A | * | 12/1999 | Yamada et al. ............ 320/104 |
| 6,075,346 A | * | 6/2000 | Kikuchi et al. ............ 320/150 |
| 6,281,646 B1 | * | 8/2001 | Masberg et al. ............ 318/139 |
| 6,319,168 B1 | * | 11/2001 | Morris et al. ............ 477/5 |

FOREIGN PATENT DOCUMENTS

EP 0917982 A1 5/1999

* cited by examiner

Primary Examiner—William A. Cuchlinski, Jr.
Assistant Examiner—Olga Hernandez
(74) Attorney, Agent, or Firm—Brooks & Kushman, P.C.; Carlos L. Hanze

(57) ABSTRACT

This invention provides a new method and system to control strategies of a combined fuel cell and battery pack power system to produce an efficient and cost-effective powertrain with acceptable drivability and low emissions. The method and system provide strategies for vehicle start-up, power load changes, and steady state driving conditions. The strategies reduce vehicle maintenance cost by increasing the battery service life and fuel efficiency. Further, the strategies reduce vehicle cost by reducing fuel cell engine size required by a hybrid electric vehicle while responding rapidly to load changes. The strategies also provide increased fuel efficiency by recovery, storage, and re-use of the vehicle kinetic energy normally dissipated as heat during braking.

8 Claims, 4 Drawing Sheets

HIGH EFFICIENCY FUEL CELL AND BATTERY FOR A HYBRID POWERTRAIN

BACKGROUND OF THE INVENTION

1. Field of Invention

The present invention relates generally to a hybrid electric vehicle and specifically to a new method and system to control a combined fuel cell and battery pack power system to produce an efficient and cost-effective powertrain with acceptable drivability.

2. Discussion of the Prior Art

The need to reduce fossil fuel consumption and pollutants from automobiles and other vehicles powered by an internal combustion engine (ICE) is well known. Vehicles powered by alternative energy sources are under development. For example, vehicles with battery powered electric traction motors are well known in the prior art. Other electric powered motor vehicles are also known having load-dependant current generators. An example of such a load-dependant system is a fuel cell system.

Fuel cells generate electrical power through an electrochemical reaction of a fuel and oxidant, such as hydrogen and oxygen. Water is the product of the electrochemical reaction in a fuel cell utilizing hydrogen and oxygen, a product that is easily disposed. See generally, U.S. Pat. No. 5,991,670 to Mufford.

The desirability of an electric motor powered vehicle is clear. Nevertheless, there remains substantial room for development of ways to improve vehicle performance. For example, in a typical battery powered electric vehicle, the electric motor drive system (the load) draws current from the battery as needed to power the electric motor more or less in an "open-loop." In this case, the battery automatically follows the load; it is "load following."

A fuel cell power source, or other load-dependent current generators, presents a more complex challenge. Here, the electric motor drive system can no longer draw current in the "open-loop" fashion described above. Controls associated with these types of systems are known in the prior art. These controls must provide a "current command" to the fuel cell system (FCS) to adjust its power output, resulting in an instantaneous "current available." This allows the FCS to also be "load following."

Problems, or undesirable effects, result when the actual current drawn by the load does not draw the amount of "current available." First, if the actual current drawn by the load is more than what the FCS makes available, the resulting high voltage DC bus created by the FCS will drop in an undesired manner, e.g., it may drop to lower than the FCS has anticipated, causing problems within the FCS. Second, if the actual DC bus current drawn by the load is bigger than what the FCS makes available, the vehicle battery pack can supply the additional current needed (the "load leveler") to meet the current command.

There are other technical obstacles to the commercialization of fuel cell powered vehicles. Cold start remains a significant challenge. So far there has been no successful demonstration of cold start which is both fast and clean. There is a requirement for fast heating of a large thermal mass. The fuel processor contains a number of catalyst beds and there is a need for a compromise between significant mass for durability and lightweight construction for speed of response. Cold start will also require attention to control techniques. Batch control in process equipment has much to offer in this regard.

Fuel cell transient operation is also a problem in addition to cold start. The choice of processes and their implementation is fundamental to achieving the right transient performance. For passenger cars, transient operation is constrained by meeting emission criteria while delivering power to meet drivability criteria. Systems issues like control and "hybridization" are fundamental to meeting such criteria. For urban driving, mechanical energy will be dissipated as heat during frequent stops. Regenerative braking, coupled with a load leveling power, like a battery pack, can recover a significant amount of energy and thus increase fuel efficiency.

Thus, there is a need to develop an efficient, cost effective method and system to control a load following source (such as a fuel cell system) and load leveling source (such as a battery) combination while maintaining vehicle drivability.

Power control strategies for a combined fuel cell and battery power control system are known in the prior art. U.S. Pat. No. 5,929,595 to Lyons et al., discloses controls for an electric vehicle with an auxiliary source of electricity such as a diesel engine. The system attempts to conform operation to a conventional ICE vehicle while also factoring battery state of charge and using batteries for load leveling. While useful, this invention does not address the most efficient means of controlling the system.

Other electric powertrain control patents exist. U.S. Pat. No. 5,780,980 to Naito, discloses a controller for an electric car, but the fuel cell is small and only used to charge the battery when the battery state-of-charge (SOC) drops to certain limit. U.S. Pat. No. 5,820,172 to Brigham et al. describes using the possible fuel cell/battery combination to meet the power requirement with least fuel cost. This system does not depend primarily on use of a FCS for load following and a battery for load leveling. Further, this patent does not consider regenerative braking to recapture kinetic energy as well as battery assistance to help start-up (including heating fuel cell, providing power to a fuel pump, and providing power to traction motor). Nor, does this patent consider the battery and fuel cell service life, durability, and performance.

U.S. Pat. No. 5,898,282 to Drozdz et al. describes an efficient method of controlling a hybrid electric vehicle with a single source for energy generation (such as an ICE, fuel cell, or metal air cell) based on vehicle speeds, regenerative braking, and system voltage levels. Again, this control system does not address cold start for a fuel cell system. Battery SOC and cold start do not effect this strategy. Further, this patent does not consider battery use pattern effect on battery service life.

Unfortunately, there does not exist a hybrid electric vehicle control strategy to address regenerative braking, efficient battery charging to increase fuel economy, cold start, and load leveling that is efficient and cost-effective with acceptable drivability.

SUMMARY OF THE INVENTION

Accordingly, the present invention provides a new method and system to control a combined fuel cell and battery pack power system to produce an efficient and cost-effective powertrain with acceptable drivability and no emissions or reduced emissions.

It is a further object of the present control system and method invention to provide reduced vehicle maintenance cost by increasing the battery service life and fuel efficiency.

It is a further object of the present control system and method to provide reduced vehicle cost by reducing fuel cell engine size required by a hybrid electric vehicle.

It is a further object of the present control system and method to respond rapidly to load changes.

It is a further object of the present control system and method to provide rapid cold start.

It is a further object of the present control system and method to provide increased fuel efficiency by recovery, storage, and re-use of the vehicle kinetic energy normally dissipated as heat during braking.

DETAILED DESCRIPTION OF PREFERRED EMBODIMENT

The present invention generally relates to a vehicle with an AC or DC electric motor drive and a load-dependent current generating system, such as a fuel cell system (FCS). Although an FCS is described in the preferred embodiment, the present invention relates to any electric powered vehicle with a load-dependent current generating system such as internal combustion engines and metal air cells.

This invention uses a vehicle power system design employing a load-leveling power source (preferably a battery pack) accompanied with a load following source (fuel cells). The invention provides a novel configuration and working mode to power an electric vehicle efficiently and to provide fast dynamic response to the load including cold start.

Figure 1:
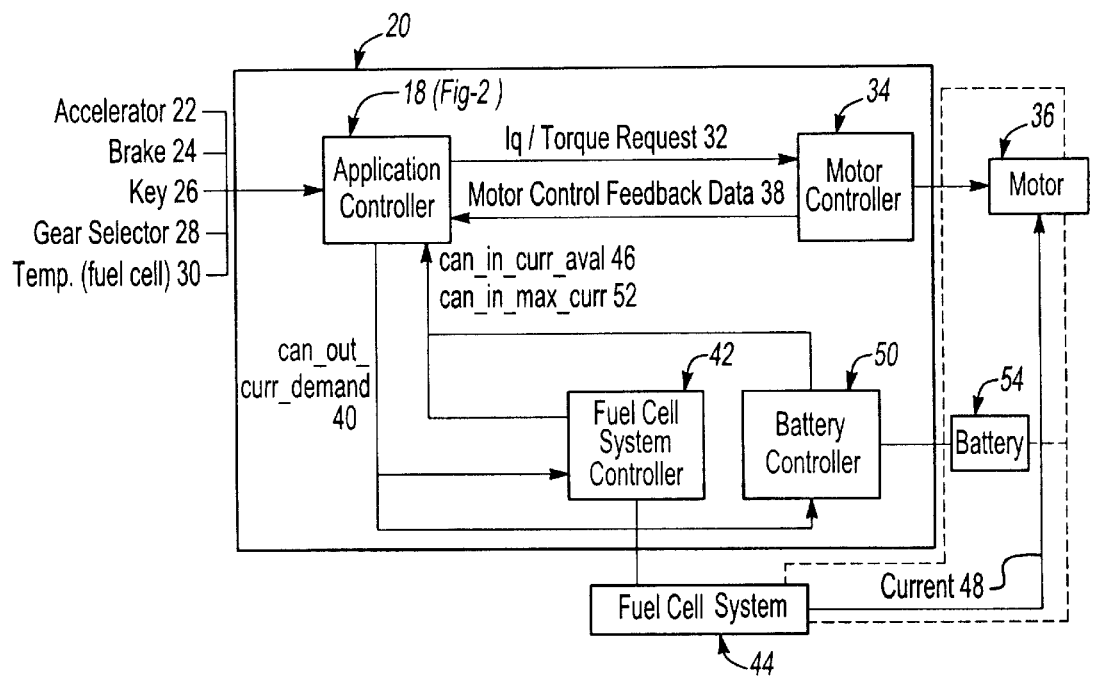
FIG. 1 illustrates a general vehicle system control to the fuel cell system using any electric traction motor.

FIG. 1 is a diagram of the major components of the preferred fuel cell and battery embodiment of the present invention utilizing any general electric traction motor. Driver demand is determined by an application controller 18 within a vehicle system control ("VSC") 20 receiving output of an accelerator position sensor 22, a brake position sensor 24, a key on/off sensor 26, a gear selector sensor 28, and various system temperature sensors (temperatures) 30. Other system limitations and conditions may also be considered in determining the driver demand.

The application controller 18 outputs an Iq/torque request 32 to a motor controller 34 that accordingly commands a vehicle's electric traction motor 36. The application controller 18 also receives motor controller feedback data 38 from the motor controller 34. The motor controller 34 is responsible for carrying out the torque command of the application controller 18 in a fast, smooth, and efficient manner, for the type of motor 36 utilized by the system.

Based on driver demand, the application controller 18 also outputs a can_out_curr_demand 40 (the desired current command) to a fuel cell system controller 42, that accordingly commands a vehicle's fuel cell system 44 and a battery controller 50, that accordingly commands a vehicle's battery 54. The application controller 18 also receives can_in_curr_aval 46 and can_in_max_curr 52 from the fuel cell system controller 42 and battery controller 50. The can_in_curr_aval 46 and can_in_max_curr 52 inputs to the application controller 18 from the fuel cell system controller 42 represent a maximum amount of current 48 the fuel cell system 44 is capable of providing (can_in_max_curr 52), and an instantaneous amount of current 48 available for use (can_in_curr_aval 46). The can_in_curr_aval 46 and can_in_max_curr 52 inputs to the application controller 18 from the battery controller 50 represent the maximum amount of current 48 the battery 54 is capable of providing (can_in_max_curr 52), and the instantaneous amount of current 48 available for use (can_in_curr_aval 46).

In summary, as shown in FIG. 1, the essential output from the application controller 18 to the fuel cell system controller 42 and battery controller 50 is the current demand, can_out_curr_demand 40. The essential output from the application controller 18 to the motor controller 34 is the amount of torque requested, Iq/torque request 32. The essential inputs to the application controller 18 come from the motor controller 34 being various motor control feedback data 38. The essential inputs to the application controller 18 from the fuel cell system controller 42 and battery controller 50 being the amount of current 48 the fuel cell system 44 and battery 54 are capable of providing (can_in_max_curr 52), and the instantaneous amount of current 48 available for use (can_in_curr_aval 46). Additionally, when the key sensor 26 senses a key-off position, the application controller 18 assures that zero current 48 is being demanded when the motor 36 is off, or disabled.

Figure 2:
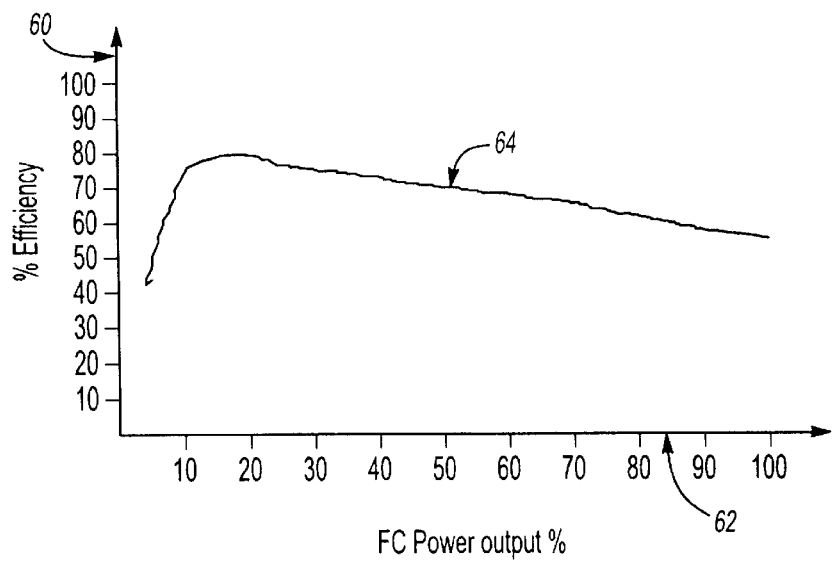
FIG. 2 illustrates a fuel cell system efficiency as a function of power output.

FCS 44 efficiency changes with power output as illustrated in FIG. 2. In FIG. 2, fuel cell system efficiency 60 is shown as a percentage on a Y-axis, and fuel cell system power output 62 is shown as a percentage on an X-axis. A fuel cell system efficiency curve 64 shows that when fuel cell system power output 62 is low, then the fuel cell system efficiency 60 is very low. Fuel cell system efficiency 60 reaches a maximum value when the fuel cell system power output 62 is 6% to 60% of its maximum power output.

The present invention seeks to keep the vehicle FCS 44 operating in this most efficient 6% to 60% range as well as assisting the FCS 44 during cold start-up and providing transient dynamic response that the FCS 44 cannot provide. This requires the use of a control strategy in the application controller 18 and the battery 54.

A FCS 44 works less efficiently than the battery 54 when its output power is low because of its parasitic load. Parasitic load, such as from an air compressor, fuel pump, etc., consumes considerable amounts of electric energy. Unfortunately, the battery 54 has relatively low energy density. The battery 54 in the present invention is anticipated to work as a load-leveling device to meet the needs of cold start-up dynamic response, and capture energy from regenerative braking. The employment of supplemental power from the battery 54 will also reduce the size of the fuel cell and, thus, reduce the cost.

The FCS 44 can also charge the battery 54 pack when vehicle torque demand or load is small or when the battery 54 state-of-charge (SOC) is small. Battery 54 charging efficiency affects the vehicle fuel efficiency. A suitable FCS 44 and battery 54 combination configuration can increase the fuel efficiency.

Battery 54 supplemental power will have a limited service life and will also reduce the fuel economy if the load leveling battery 54 experiences inappropriate charge and discharge. In a premature capacity loss a decrease of the battery's 54 service life will result. A limited battery 54 service life will increase the overall vehicle maintenance cost.

Figure 3:
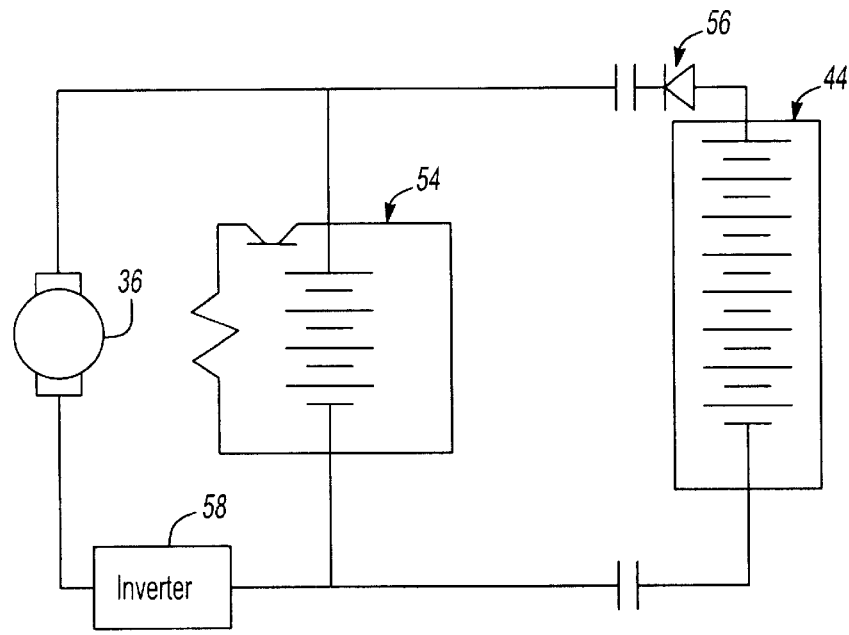
FIG. 3 illustrates that the power system consists of a fuel cell system and a battery pack (or battery module) connected in parallel.

FIG. 3 illustrates a power system with the fuel cell system 44 and battery 54 (or battery module) connected in parallel (the vehicle system controller 20 connections are not shown). A diode 56 (or alternatively any system comprising a diode and insulated gate bipolar transistors (IGBT)) has several functions. When a power requirement from the load (motor 36) is low, the FCS 44 provides current or voltage to charge the battery 54 efficiently when the battery 54 state-of-charge (SOC) is low. When the power requirement is high, both the battery 54 and FCS 44 together provide power to meet the load need. An inverter 58 should also be associated with the FCS 44 and/or battery 54 to assure proper power and power distribution as required by the control strategy of the present invention.

The strategy of the present invention is best understood using the assumptions illustrated below for the various configuration components. The FCS 44 maximum power output $P_{fmax}=P_1$. The FCS 44 SOC is named as SOCf. The FCS 44 higher efficient working range is $P_f$. FCS 44 transient available power is $P_a$. A warning signal will be given if the SOCf is less than lower limit SOCf1.

The battery 54 maximum power output (peak or sustain power limit) $P_{bmax}=P_2$. Battery 54 SOC is named as SOCb. The power requirement from the vehicle load (e.g., motor 36) is $P_{req}$. In the preferred embodiment, the battery 54 and FCS 44 are connected in parallel.

The inverter 58 should be associated with the FCS 44 and/or battery 54 to assure proper power and power distribution as required by the control strategy of the present invention. For example, the FCS 44 open circuit voltage is 450V, 240 cells Ni/MH battery pack open circuit voltage (when fully charged) is 340V. The FCS 44 and battery 54 cannot both provide the peak power to the load requirement. Inverters are needed to give flexibility to have the FCS 44 and battery 54 give required power as needed.

The SOC lower limit for the battery 54 to stop providing power is SOCb1. The SOC lower limit for the battery 54 to stop providing power to a high voltage bus (or to provide power to meet a FCS 44 power deficiency, not including the power needed for FCS 44 start-up) is SOCb2. The SOC lower limit for the battery 54 to start recharging from the FCS 44 is SOCb3. The SOC upper limit for the battery 54 to stop charging from FCS 44 is SOCb4. The SOC upper limit to stop charging the battery 54 from regenerative braking is SOCb5. Where 0–10%<SOCb1<10–20%; 10–20%<SOCb2<30–50%; 40–50%<SOCb3<70–80%, 70–80%<SOCb4<70–90%; 75–85%<SOCb5<=100%.

The power requirement from the load (power needed for the inverter 58) is $P_{req}$. The inverter 58 is needed to give enough flexibility to get required power as needed from the battery 54 and FCS 44.

Figure 4:
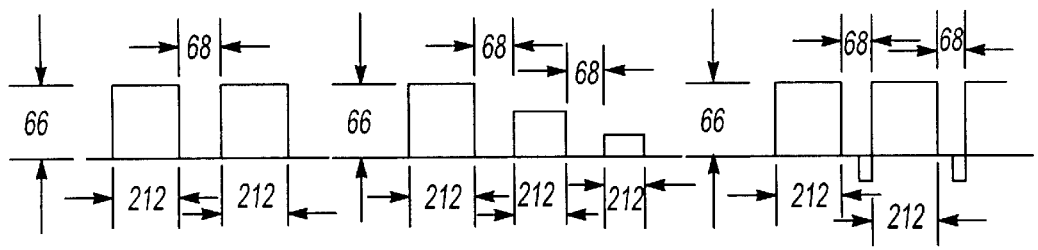
FIG. 4 illustrates pulse shapes of a battery pulse-charging mode.

A battery 54 charging mode (by the FCS 44 or regenerative braking) can be constant current, constant voltage, or a combination of these two. Battery 54 charging from FCS 44 and regenerative braking can also use a pulse charging method that can increase battery 54 charging efficiency and battery 54 service life. For a pulse-charging mode, the pulse shape can be any of those illustrated in FIG. 4. In FIG. 4, pulse duration 212 and pulse amplitude 66 can be modulated during the charging process. The pulse amplitude 66 can be in the 0.1 C to 10 C rate (C rate means using the current that can discharge the battery to the rated capacity in one hour; 0.1 C is the current of 1 per tenth of this 1 C rate; and 10 C rate is ten times of 1 C rate). The pulse duration 212 can be 1 microsecond to 10 seconds. A rest duration 68 can be 0.1 milliseconds to 10 seconds.

During FCS 44 start-up, if SOCb4>SOCb>SOCb2, always use the battery 54 to assist FCS 44 start-up (including FCS 44 heat-up and to provide power to FCS 44). This is because the energy needed to assist fuel cell start-up changes with environmental temperature and battery 54 capacity changes with environmental temperature as well as battery 54 discharge rate. SOCb2, SOCb3, and SOCb4 can be made to change with environmental temperature changes. For example, to better serve the fuel cell start-up purpose if the environmental temperature is very low (e.g., –15° C.), the SOCb2 can be increased up to 95%.

Figure 5:
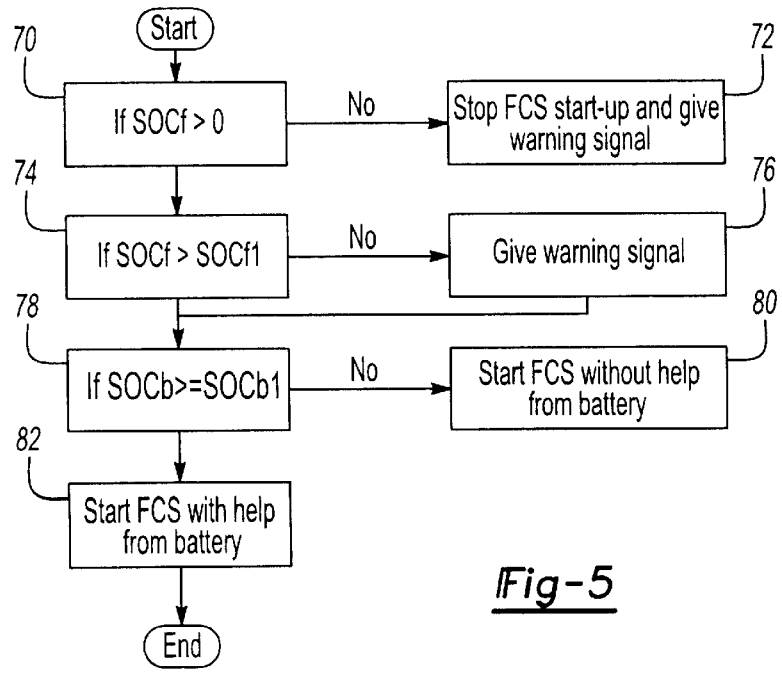
FIG. 5 illustrates a control strategy for the vehicle power system consisting of a combined FCS 44 and Battery 54 during an FCS 44 start-up.
Figure 6:
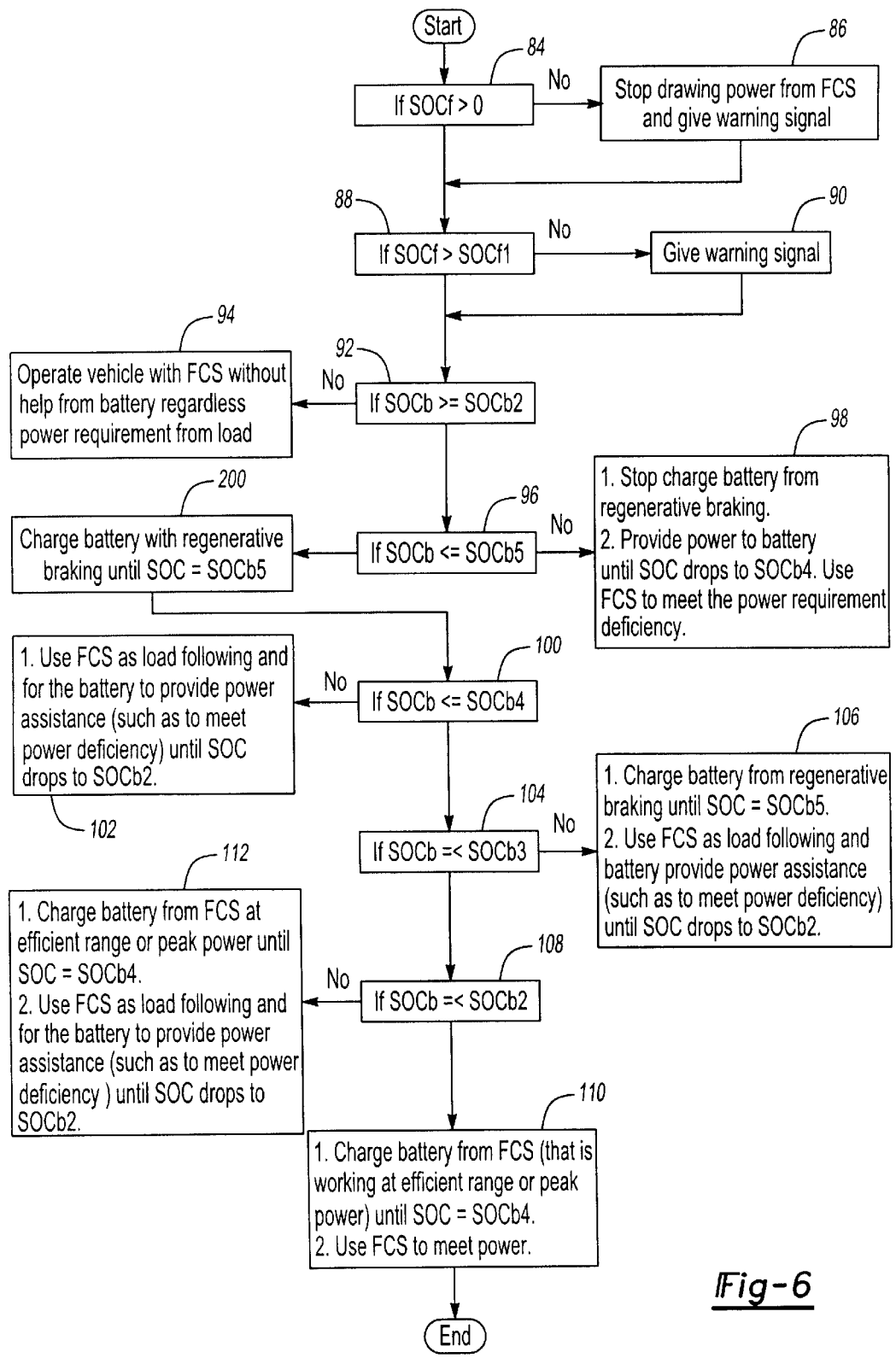
FIG. 6 illustrates a control strategy for the vehicle power system consisting of a combined FCS 44 and Battery 54 during a load change.
Figure 7:
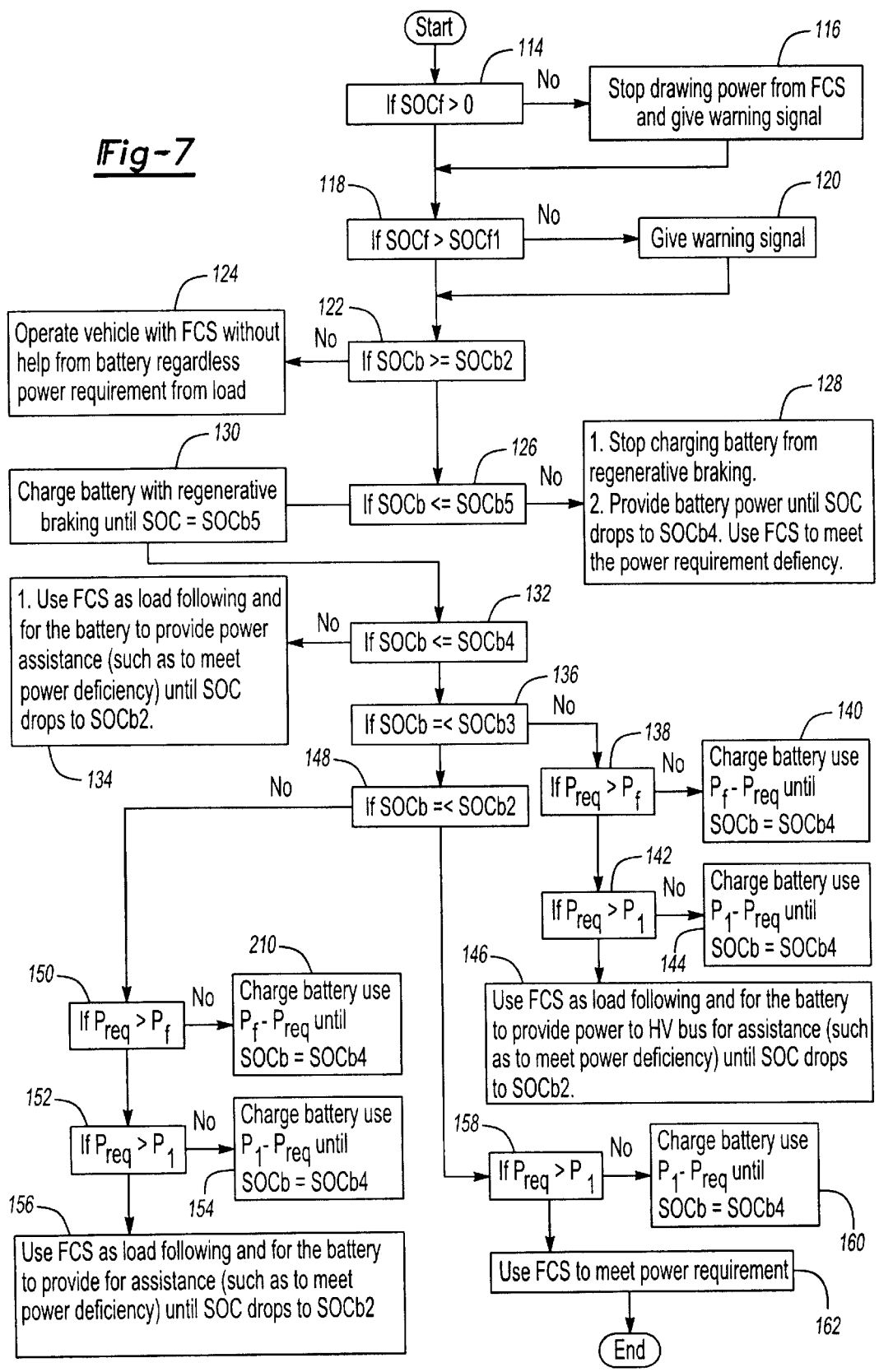
FIG. 7 illustrates a control strategy for the vehicle power system consisting of a combined FCS 44 and Battery 54 during steady state load conditions.

Using the assumptions illustrated above, the control strategy of the present invention is illustrated in FIGS. 5, 6, and 7 using working modes from fuel efficiency and vehicle drivability point of view.

FIG. 5 illustrates a control strategy for the vehicle power system consisting of a combined FCS 44 and battery 54 during an FCS 44 start-up. When the start-up strategy begins, the VSC 20 determines if SOCf>0 in step 70. If SOCf is not >0, the strategy issues a command 72 to stop FCS start-up and give warning signal to a vehicle operator. If SOCf>0 in step 70, the strategy advances to step 74. At step 74 the strategy determines if SOCf>SOCf1. If SOCf is not >SOCf1, the strategy issues a command 76 to give a warning signal to the vehicle operator and proceed to step 78. If SOCf>SOCf1 in step 74, the strategy advances to step 78. At step 78, the strategy determines if SOCb>=SOCb1. If SOCb is not >=SOCb1 in step 78, the strategy issues a command 80 to start the FCS 44 without help from the battery 54. If SOCb>=SOCb1 in step 78, the strategy issues a command 82 to start the FCS 44 with help from the battery 54.

FIG. 6 illustrates a control strategy for the vehicle power system consisting of a combined FCS 44 and battery 54 during a load change. When the strategy starts, it first determines at step 84 if SOCf>0. If SOCf is not >0, the strategy gives a command 86 to stop drawing power from the FCS 44 and give a warning signal to the vehicle operator. If SOCf>0, the strategy advances to step 88. At step 88, the strategy determines if SOCf>SOCf1. If SOCf is not >SOCf1, the strategy issues a command 90 to give the operator a warning signal and proceed to step 92. If SOCf>SOCf1 at step 88, the strategy proceeds to step 92. At step 92, the strategy determines if SOCb>=SOCb2. If SOCb is not >=SOCb2, the strategy gives a command 94 to operate the vehicle with FCS 44 without help from the battery 54 irrespective of power requirement. If SOCb>=SOCb2, the strategy proceeds to step 96. At step 96, the strategy determines if SOCb<=SOCb5. If SOCb is not <=SOCb5, the strategy issues a command 98 that stops the battery 54 from charging using regenerative braking, provides power to the battery 54 until SOC drops to SOCb4, and uses the FCS 44 to meet any power requirement deficiencies. If SOCb<=SOCb5, the strategy issues a command 200 to charge the battery 54 using regenerative braking until SOC=SOCb5 and proceed to step 100. At step 100, the strategy determines if SOCb<=SOCb4. If SOCb is not <=SOCb4, the strategy issues a command 102 to use the FCS 44 as load following and the battery 54 to provide power assistance (such as to meet a power deficiency) until SOC drops to SOCb2. If SOCb<=SOCb4, the strategy proceeds to step 104. At step 104, the strategy determines if SOCb=<SOCb3. If SOCb is not =<SOCb3, the strategy issues a command 106 to charge the battery 54 from regenerative braking until SOC SOCb5 and to use the FCS 44 as load following and the battery 54 to provide power assistance (such as to meet a power deficiency) until SOC drops to SOCb2. If SOCb=<SOCb3, the strategy proceeds to step 108. At step 108, the strategy determines if SOCb=<SOCb2. If SOCb is not =<SOCb2, the strategy issues a command 112 to charge the battery 54 from the FCS 44 (working at efficient range or peak power) until SOC=SOCb4 and use the FCS 44 as load following and the battery 54 to provide power assistance (such as to meet power deficiency) until SOC drops to SOCb2. If SOCb=<SOCb2, the strategy issues a command 110 to charge the battery 54 from the FCS 44 at an efficient range or peak power until SOC=SOCb4 and use the FCS 44 to meet vehicle power requirements.

FIG. 7 illustrates a control strategy for the vehicle power system consisting of a combined FCS 44 and battery 54 during steady state, i.e., not during FCS 44 start-up or vehicle load change. When the strategy starts, it first determines at step 114 if SOCf>0. If SOCf is not >0, the strategy issues a command 116 to stop drawing power from the FCS 44, give a warning signal to the vehicle operator, and proceed to step 118. If SOCf>0, the strategy proceeds to step 118. At step 118, the strategy determines if SOCf>SOCf1. If SOCf is not >SOCf1, the strategy issues a command 120 to give the vehicle operator a warning signal and proceed to step 122. If SOCf>SOCf1, the strategy proceeds to step 122. At step 122, the strategy determines if SOCb>=SOCb2. If SOCb is not >=SOCb2, the strategy issues a command 124 to operate the vehicle with the FCS 44 without help from the battery 54 irrespective of the power requirement from the load. If SOCb>=SOCb2, the strategy proceeds to step 126. At step 126, the strategy determines if SOCb<=SOCb5. If SOCb is not <=SOCb5, the strategy issues a command 128 to stop charging the battery 54 from regenerative braking and to provide battery 54 power until SOC drops to SOCb4. The FCS 44 is used to meet the power requirement deficiency. If SOCb<=SOCb5, the strategy issues a command 130 to charge the battery 54 from regenerative braking until SOC=SOCb5 and proceed to step 132. At step 132, the strategy determines if SOCb<=SOCb4. If SOCb is not <=SOCb4, the strategy issues a command 134 to use the FCS 44 as load following and the battery 54 to provide power assistance (such as to meet a power deficiency) until SOC drops to SOCb2. If SOCb<=SOCb4, the strategy proceeds to step 136. At step 136, the strategy determines if SOCb=<SOCb3. If SOCb is not =<SOCb3, the strategy proceeds to step 138 and determines if $P_{req}>P_f$. If $P_{req}$ is not >$P_f$, the strategy issues a command 140 to charge the battery 54 using $P_f-P_{req}$ until SOCb=SOCb4. If $P_{req}>P_f$, the strategy proceeds to step 142 and determines if $P_{req}>P_1$. If Preq is not >$P_1$, the strategy issues a command 144 to charge the battery 54 using $P_1-P_{req}$ until SOCb=SOCb4. If $P_{req}>P_1$, the strategy issues a command 146 to use the FCS 44 as load following and the battery 54 to provide power assistance (such as to meet a power deficiency) until SOC drops to SOCb2.

Going back to step 136, if SOCb=<SOCb3, the strategy proceeds to step 148 and determines if SOCb=<SOCb2. If SOCb is not =<SOCb2, the strategy proceeds to step 150 and determines if $P_{req}>P_f$. If $P_{req}$ is not >$P_f$, the strategy issues a command 210 to charge the battery 54 using $P_f-P_{req}$ until SOCb=SOCb4. If $P_{req}>P_f$, the strategy proceeds to step 152 and determines if $P_{req}>P_f$. If Preq is not >$P_1$, the strategy issues a command 154 charge the battery 54 using $P_1-P_{req}$ until SOCb=SOCb4. If $P_{req}>P_1$, the strategy issues a Command 156 to use the FCS 44 as load following and the battery 54 to provide power assistance (such as to meet a power deficiency) until SOC drops to SOCb2.

Going back to step 148, if SOCb=<SOCb2, the strategy proceeds to step 158 and determines if $P_{req}>P_1$. If Preq is not >$P_1$, the strategy proceeds to command 160 to charge the battery 54 using $P_1-P_{req}$ until SOCb=SOCb4. If Preq>$P_1$, the strategy issues a command 162 to use the FCS 44 to meet vehicle power requirements.

In summary, the present invention provides a control strategy that addresses the fuel efficiency of the combined fuel cell engine and battery pack power system. Further, the control strategy: reduces vehicle maintenance cost by increasing the battery service life and fuel efficiency, reduces vehicle cost, can respond rapidly to load changes, provides for rapid FCS start and regenerative braking, allows battery power assistance for acceleration and hill climbing, thus permitting a smaller, potentially less expensive and more efficient primary FCS.

Although this invention has been described and illustrated in detail, it is to be clearly understood that this description is not to be taken by way of limitation. The spirit and scope of the invention are to be limited only by the terms of the appended claims.

We claim:

1. A process for controlling a load-dependent current generating system in an electric vehicle that is
   efficient and cost-effective with acceptable drivability and low emissions, comprising the steps of;
   determining vehicle state;
   determining vehicle load;
   calculating a desired current output for the load-dependent current generating system based on vehicle load;
   calculating available current output from the load-dependent current generating system; starting the load-dependent current generator system; operating the load-dependent current generating system in its most efficient range of operation;
   determining whether a stored powered source is needed to level vehicle load;
   utilizing a second stored power source to level vehicle load; and
   recapturing vehicle kinetic energy using regenerative braking.

2. The process of claim 1 wherein the load-dependent current generating system is a fuel cell.

3. The process of claim 1 wherein the stored power source is a battery.

4. The process of claim 1, wherein determining vehicle state comprises the steps of,
   determining whether vehicle start-up strategy is needed;
   determining whether vehicle load changing strategy is needed; and
   determining whether vehicle steady state drive strategy is needed.

5. The process of claim 2, wherein the efficient range of operation is 6% to 60% of power capability.

6. The process of claim 2 further comprising the step of using the stored power source for assisting the fuel cell system during cold start-up.

7. The process of claim 2 further comprising the step of providing transient dynamic response using the stored power source to level power load.

8. The process of claim 3, wherein cost effectiveness is achieved by reducing vehicle maintenance cost by increasing battery service life and fuel efficiency through charging and discharging the battery in a pulse manner.

* * * * *